(12) United States Patent  (10) Patent No.: US 7,551,779 B2
Garside et al.  (45) Date of Patent:  Jun. 23, 2009

(54) WORD OR CHARACTER BOUNDARY-BASED SCRATCH-OUT GESTURE RECOGNITION

(75) Inventors: Adrian J. Garside, Sammamish, WA (US); Takanobu Murayama, Seattle, WA (US); Tracy Schultz, Bellevue, WA (US); Daphne Guericke, Seattle, WA (US); Ernest L. Pennington, Issaquah, WA (US); Shou-Ching Schilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 11/083,773

(22) Filed: Mar. 17, 2005

(65) Prior Publication Data

US 2006/0210163 A1   Sep. 21, 2006

(51) Int. Cl.
*G06K 9/18*   (2006.01)
(52) U.S. Cl. .................................................. 382/186
(58) Field of Classification Search ......... 382/181–187, 382/199; 345/156, 173, 179
See application file for complete search history.

(56) References Cited

U.S. PATENT DOCUMENTS

| 5,500,937 | A | * | 3/1996 | Thompson-Rohrlich | .... 715/764 |
| 5,666,139 | A | * | 9/1997 | Thielens et al. | ............. 345/173 |
| 5,848,187 | A | * | 12/1998 | Bricklin et al. | ............. 382/187 |
| 5,991,441 | A | * | 11/1999 | Jourjine | ...................... 382/187 |
| 2003/0182630 | A1 | * | 9/2003 | Saund et al. | ................ 715/530 |

* cited by examiner

*Primary Examiner*—Daniel G Mariam
(74) *Attorney, Agent, or Firm*—Workman Nydegger

(57) ABSTRACT

Described is a computer-implemented system and method that detects and differentiates scratch-out gestures from other electronic ink, e.g., entered via a pen. The system and method compare boundary-based criteria to differentiate, which eliminates the need to have a specially-shaped scratch-out pattern, instead allowing a wide variety of scratch-out styles to be detected. Criteria includes boundary-based evaluations such as whether the potential scratch-out gesture intersects previously recognized words or characters, whether the scratch-out gesture has a width that is at least a threshold percentage of the width of a word or character bounding box, whether the electronic ink extends beyond the midpoint of the bounding box, and whether at least some portion of the scratch-out gesture is above a baseline of the word or character. Scratch-out gestures entered in freeform input writing areas and boxed input writing areas are supported.

20 Claims, 14 Drawing Sheets

WORD OR CHARACTER BOUNDARY-BASED SCRATCH-OUT GESTURE RECOGNITION

FIELD OF THE INVENTION

The present invention relates generally to computing devices, and more particularly to user interaction with computing devices.

BACKGROUND OF THE INVENTION

Contemporary computing devices allow users to input information in a number of ways, including via a keyboard, by or more types of pointing devices, and dedicated hardware buttons (typically on portable devices). With respect to pointing devices, a computer system may receive user input from a mouse and/or a touchpad, and if configured with a digitizer, by sensing pen and touch data, e.g., entered via a stylus (pen) or a finger.

Some personal computers, such as tablet-based personal computers, have the digitizer built into the display screen. This is highly beneficial for many users, because such a computing device can be operated with or without a keyboard. Tablet-based personal computers and similar handwriting-receptive computing devices allow users to enter handwritten data such as printed characters and cursive words. One valuable aspect of being able to enter handwriting into a computing device is that the written words can be recognized as text, after which the text can be searched, presented and edited by a text-editing program, and so forth.

One feature on some devices that is provided to users is that entered characters and words are able to be scratched out. Unlike ink on paper, the ink input system automatically removes scratched-out characters and words that the user deems should be removed. To this end, contemporary devices are configured to detect a scratch-out gesture, which is basically a particular symbol drawn on a tablet screen "through" the scratched-out word or character, or a particular movement made with a tablet pen, that erases ink.

Existing scratch-out gesture recognition systems are based on neural networks, and suffer from some significant usability problems. A main cause of the problems results from requiring a generally (and typically horizontally elongated) Z-shaped gesture. The neural net recognizer has stringent requirements for what constitutes a scratch-out gesture, which cause a relatively high rate of false negatives (e.g., the user wants to scratch-out some ink, but instead the gesture is recognized as an ink stroke). The gesture requirements also unnaturally limit the user in that the required scratch-out gesture is not something users will inherently discover; typical users may attempt some form of scratch-out gesture, however the Z-shaped gesture is neither intuitive nor natural to most users.

What is needed is a more natural scratch-out gesture (or set of gestures) that works with most users' personal styles of crossing out text. Any such scratch-out gesture should be intuitive for users as well as inherently discoverable, and generally should increase user satisfaction with hand-entered deletion operations. At the same time, the rate of correctly differentiating scratch-out gestures from other ink input should be improved.

SUMMARY OF THE INVENTION

Briefly, the present invention provides a system and method that differentiates certain electronic ink in the form of a scratch-out gesture from other ink, by evaluating the position and horizontal width of a potential scratch-out gesture against the boundaries of words or characters that may be scratched out. Threshold amounts and ratios are used to decide whether a gesture is a scratch out or further ink.

As a user enters electronic ink data corresponding to strokes, a scratch-out gesture detector applies various threshold-based rules to differentiate between scratch-out gestures and other ink input. Scratch outs are used to erase existing ink, while non-scratch outs add ink strokes to other strokes representing characters or words. Because the scratch-out gesture detector uses word and character boundaries for its decision making, scratch-out is not limited to any predefined scratch-out gesture. Thus, any of several scratch-out styles may be used, including a strikethrough gesture, a Z-shaped gesture, a vertical scratch-out gesture, a circular scratch-out gesture, an angled scratch-out gesture, and crossing out, including an X-shaped gesture or double strikethrough gesture.

In general, any single stroke may be recognized as a scratch-out gesture. Example criteria for differentiating a scratch-out stroke from an inking stroke may include that a scratch-out needs to be on top of a previously recognized word or character (intersect its bounding box), and/or that a scratch-out stroke needs to have a certain ratio of its width (horizontally) to the width of the previously recognized word or character. To allow for scratch-out styles such as crossing out a word (an X-out or a double-strikethrough approach), a stroke meeting timing and/or proximity criteria relative to a previous scratch-out gesture is considered part of the same scratch-out gesture.

In one implementation, in a free-formed lined writing area, a stroke qualifies as a scratch-out gesture relative to a word or words when the scratch-out gesture stroke intersects one or more previously recognized words, and has a bounding box width that achieves at least a threshold percentage of the width of the bounding box of the previously recognized word or word that the stroke intersects. The stroke also needs to intersect with the word's bounding box by more than some amount (e.g., one-half) of the width of the word's bounding box, and a portion of the scratch-out stroke needs to be above the baseline for the line on which the word or words sit. Different thresholds may be used based on the actual measured length of the word, in distance (which may include relative distances such as pixels).

Another type of writing entry surface comprises a boxed writing area, where a user enters a character per box. In one implementation, criteria for a scratch-out gesture includes that the stroke needs to intersect one or more previously recognized characters, and has a bounding box width that is at least some threshold percentage of the width of the box of the previously recognized character or characters that the stroke intersects. Further, the stroke needs to cross a point such as the center vertical axis (half the width) of the box or boxes for the character or characters it intersects. Also, some portion of the scratch-out stroke needs to be above the baseline for the line on which the character or characters sit.

In freeform lined areas and a boxed writing areas, a single stroke may scratch-out multiple boxes, including boxes that are across multiple lines. When a single stroke is used to scratch out multiple words or characters on a line, the intervening words or characters between the first and last word or character scratched out are deleted, even if the stroke does not intersect one or more of their bounding boxes, or does not qualify as an scratch-out with respect to one or more of them. Similarly, when a single stroke is used to scratch out words or characters on multiple lines, the words or characters between the first and last word or character scratched out are deleted, even if the stroke does not intersect one or more of them or, if it does intersect, does not otherwise qualify as an scratch-out with respect to one or more of them.

When a word is scratched out and it is not the last word, the next word is also scratched out if there is no space between it and the previous word, and the word is one character long. Thus, punctuation such as a period is scratched out at the end of a sentence even though the scratch out gesture deletes the previous word but does not necessarily intersect with next word.

Other advantages will become apparent from the following detailed description when taken in conjunction with the drawings, in which:

DETAILED DESCRIPTION

Exemplary Operating Environment

Figure 1:
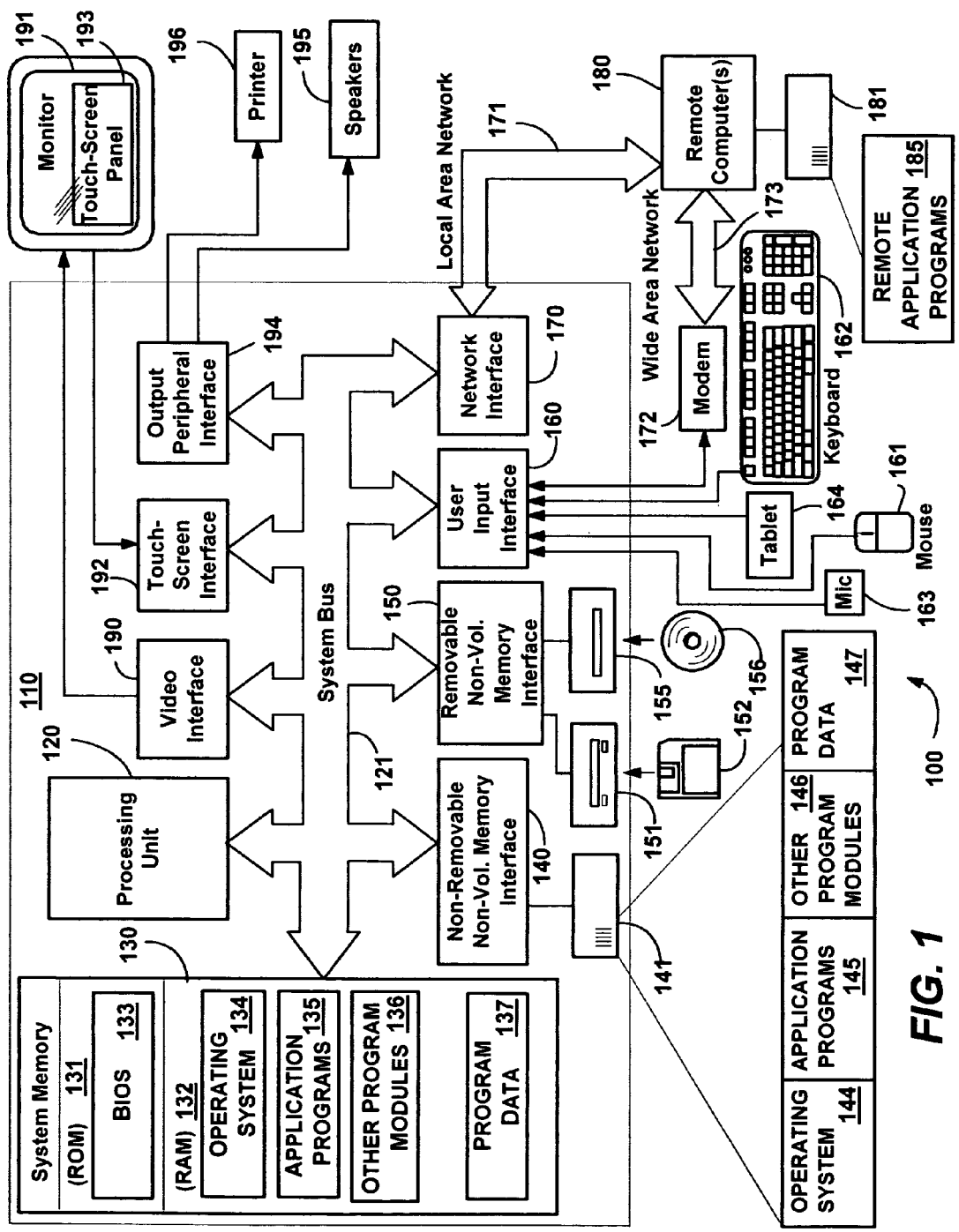
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Scratch-Out Detection

The present invention is primarily directed towards user input data entered via electronic inking, generally computer pen (stylus) input received as electronic ink at a pen digitizer. In general, the ink may be received at a freeform input area, where it is recognized into words, where as used herein, a "word" may be any combination or permutation of one or more characters, symbols and the like, even if not an actual word, that is logically separable in some way from other words. Ink may also be received at a boxed writing area, in which (typically) one character is entered per box. In addition to word and character entry, the present invention detects and differentiates certain electronic ink in the form of a scratch-out gesture, which the user enters when intending to erase previously entered words or characters, such as by drawing a line through a set of one or more previously entered words or characters, or through typed (or recognized) text that is to be deleted. The differentiation evaluates the position and horizontal width of the gesture against the boundaries of words or characters that may be scratched out, using threshold amounts and ratios to decide whether a gesture is a scratch out, or further ink.

As will be understood, numerous ways to implement the present invention are feasible, and only some of the alternatives are described herein. For example, in one implementation, word boundaries are determined by a handwriting-to-text recognizer. However, other ways to delineate word boundaries may be employed, such as one that evaluates white space between written input, such as when a recognizer is not available, or is not keeping up with the user's rate of input. Indeed a recognizer is not even necessary to the present invention, e.g., a user can scratch out handwriting input that is then erased, independent of whether the system even has a recognizer. Further, while English language words are used in the example, the present invention is language independent. As such, the present invention is not limited to any particular examples used herein, but rather may be used various ways that provide benefits and advantages in computing in general.

Figure 2:
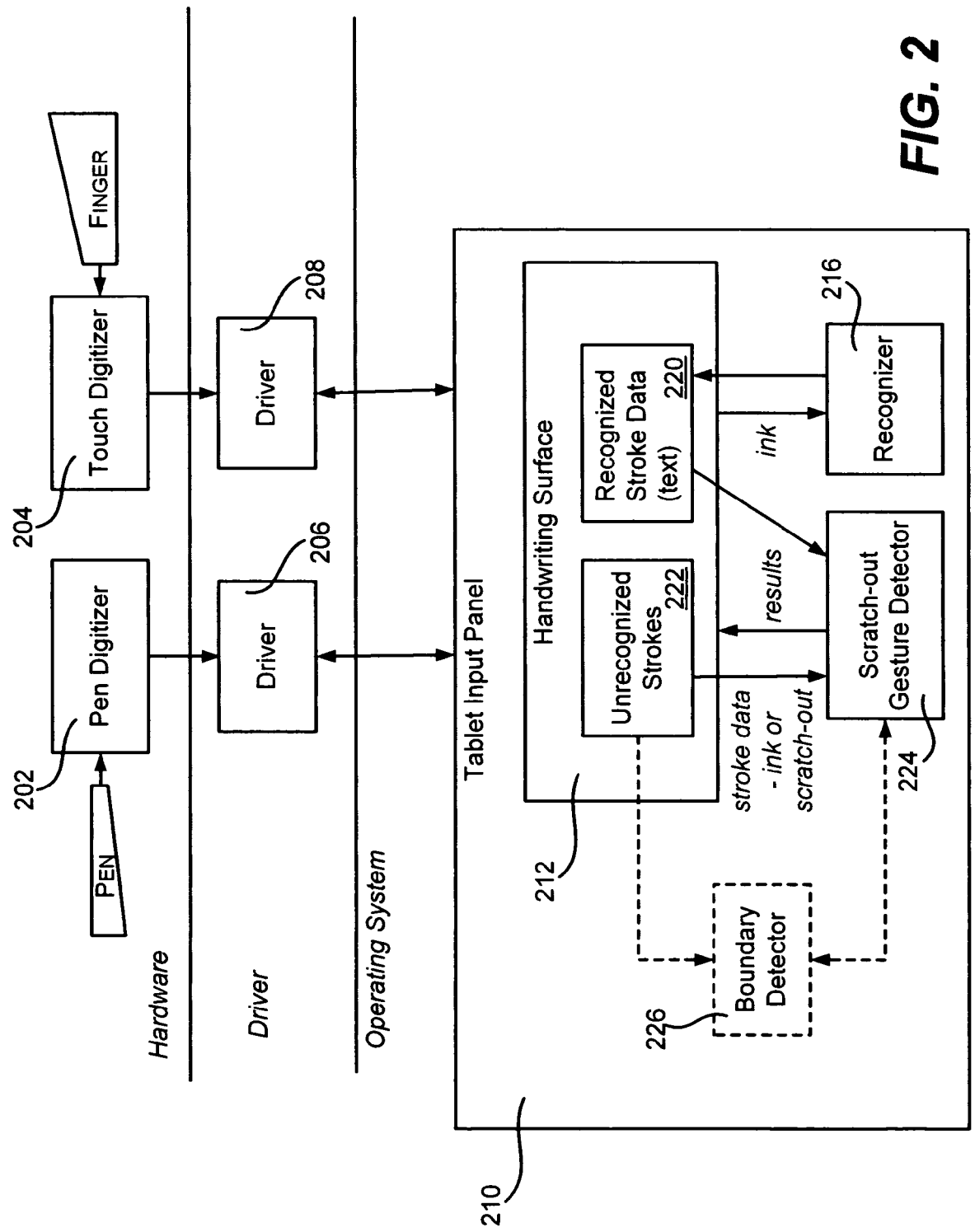
FIG. 2 is a block diagram generally representing components for handling user input, including pen input, and for detecting scratch-out gestures in accordance with various aspects of the present invention.

Turning to FIG. 2, there is shown an example architecture in which a pen digitizer 202 and a touch digitizer 204 couples through a suitable driver 206 and 208 to an operating system level component, referred to as the tablet input panel 210. Note that for purposes of example, each input device is shown as having its own driver, however one driver may handle the input of more than one device.

As represented in FIG. 2, the tablet input panel 210 may comprise an object or the like that includes a handwriting surface 212 on which the user enters electronic ink data, corresponding to strokes. As is known, such strokes may be sent to a recognizer 216, which returns text based on those strokes, e.g., one or more words. If more than one word is returned, the words are typically associated with some probability data or ranking, with the most probable word automatically chosen for the user by default. Because recognition is not instantaneous, at any given time there may be recognized stroke data (text) 220 and unrecognized stroke data 222.

The tablet input panel 210 supports different types of handwriting surfaces. Surfaces include a freeform writing area 320 (FIG. 3), which may be set (e.g., lined) as a free-form text recognition panel with editing capability for character input, a soft (e.g., QWERTY) keyboard, and a boxed input area 430 (FIG. 4), in which handwriting is entered as individual characters, such as for completing formatted fields. Note that although the ink may be received in a freeform inking area, one implementation constrains the user to freeform writing in lined input areas in which the user enters ink one line at a time. This makes it easier to determine the boundaries between words, which is otherwise more difficult when users can write in any direction and/or any configuration.

In accordance with various aspects of the presenting invention, a scratch-out detector 224 applies various threshold-based rules to differentiate between scratch-out gestures and other ink input, and also applies threshold-based rules to determine to which words or boxes a scratch-out gesture is directed. To this end, the surface 212 provides the unrecognized stroke data to the scratch-out gesture detector 224, which then compares the stroke data to the recognized stroke data (text word or words or boxed character or characters) 220 to determine if the stroke comprises a scratch-out gesture. The scratch-out gesture detector 224 returns results to the surface 212; for a scratch-out gesture, the results include the words and stroke or strokes to erase. For a non-scratch-out gesture, the result is such that the stroke is provided as part of the ink data sent to the recognizer 216. Note that this is only one example mechanism for processing strokes.

For example, an alternative mechanism may handle situations in which the recognizer gets behind the user and processes strokes for recognition slower than the user can go back and scratch out those strokes. An optional (as indicated by the dashed box and lines in FIG. 2) boundary detector 226 that can estimate word boundaries, e.g., based on spacing rather than recognition, may be used by the scratch-out gesture recognition detector 224 for differentiating scratch-out from other gestures. Note that such a boundary detector 226 may be used at other times, such as in conjunction with recognition results. In any event, it is straightforward to alternatively implement scratch-out detection on non-recognized strokes, as long as there is some pre-recognition boundary definition.

As described above, and in contrast to other (e.g., neural network-based) systems, the scratch-out gesture detector 224 of the present invention uses word and character boundaries for its decision making, whereby scratch-out is not limited to any predefined scratch-out gesture. For example, there are no constraints on direction of strokes, order of strokes, or number of zigzags. Instead, the scratch-out detector 224 essentially assumes that when in a lined writing area 320, the user is only writing text (in contrast to drawing pictures or diagrams) in order to distinguish scratch-out gestures from words or boxed letters. Thus, any of several scratch-out styles may be used. Some styles that will be recognized as scratch-out gestures include a strikethrough gesture, a Z-shaped gesture, a vertical scratch-out gesture (e.g., in the general pattern of an M or W), a circular scratch-out gesture, an angled scratch-out gesture, and crossing out, including an X-shaped gesture or double strikethrough gesture. A user's personal scratch-out style will also work, or be configurable to work, as a scratch-out gesture.

In general, any single stroke may be recognized as a scratch-out gesture based on established criteria, such as predefined or based on a user training the system. In one implementation, a cross-out (e.g., X-shaped or double strikethrough) gesture will result in the first stroke being analyzed for scratch-out, and if first stroke is determined to be a scratch-out, with the second stroke either erased or considered as a later ink stroke, based on the timing and proximity of the second stroke relative to the scratch-out stroke, as described below. Thus, two (and possibly more) rapid and close scratch-out strokes will be considered a single scratch-out, while one scratch-out stroke followed considerably later by another stroke, and/or far away from the scratch-out stroke, will be considered new ink. In this way, a user can enter ink somewhat shortly after scratching out other ink, yet still use multiple rapid scratch out strokes.

Example criteria for differentiating a scratch-out stroke from an inking stroke may include that a scratch-out needs to be on top of a previously recognized word or character, and/or that a scratch-out stroke needs to have a certain ratio of its width (that is, horizontal length, not thickness) to the width (horizontal length) of the previously recognized word or character. Bounding boxes may be computed for the comparison.

Figure 3:
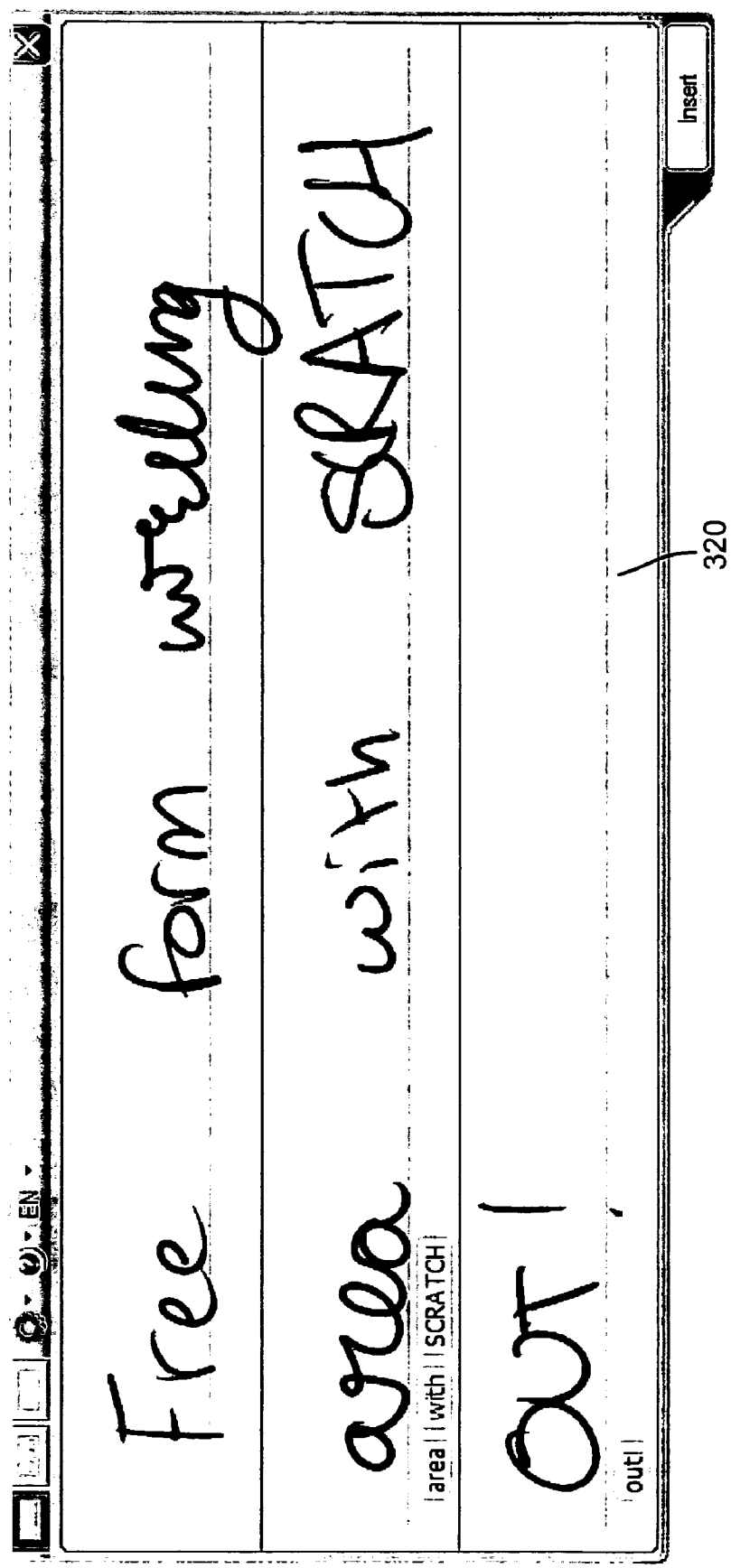
FIG. 3 is a representation of an example freeform (lined) writing area into which scratch-out gestures may be entered in accordance with various aspects of the present invention.
Figure 5A:
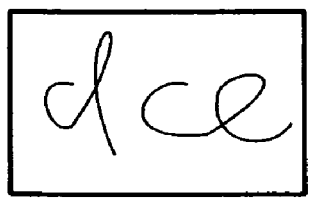
FIGS. 5A-9 are example representations of scratch-out gestures and non-scratch-out gestures as determined based on various criteria in accordance with various aspects of the present invention.
Figure 5A:
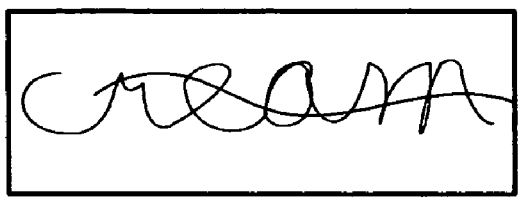
Figure 5B:
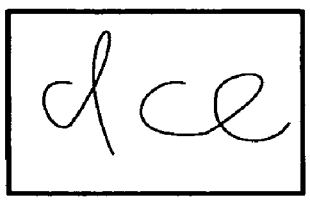
Figure 5B:
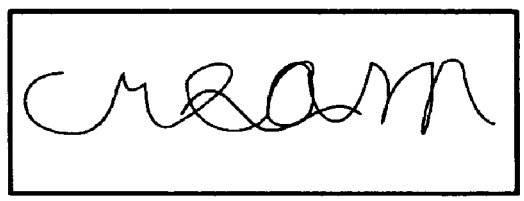

In one implementation, in a free-formed lined writing area, such as the area 320 represented in FIG. 3, a stroke qualifies as a scratch-out gesture relative to a word or words when it meets a number of criteria. Criteria for free-formed word entry includes that a scratch-out gesture stroke intersects one or more previously recognized words (comprising at least one character), and has a bounding box width that achieves at least a threshold percentage (e.g., eighty percent) of the width of the bounding box of the previously recognized word or word that the stroke intersects. This is generally represented in FIG. 5A, where the long stroke substantially over the handwritten word "cream" is considered a scratch out gesture, compared to FIG. 5B, where the stroke is not long enough.

Figure 6A:
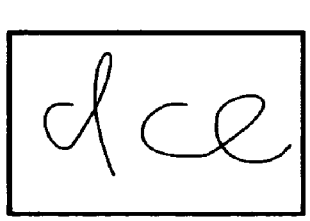
Figure 6A:
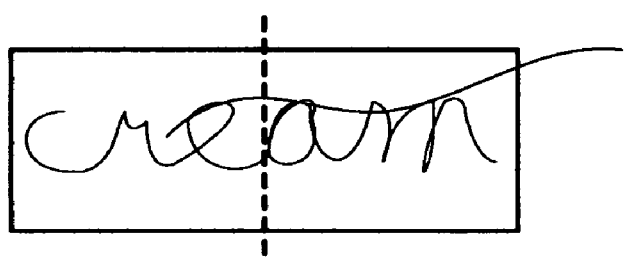
Figure 6B:
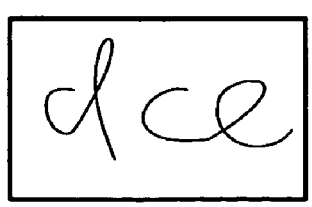
Figure 6B:
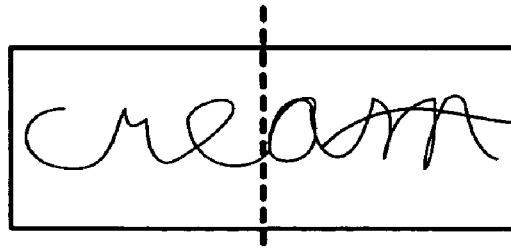
Figure 7A:
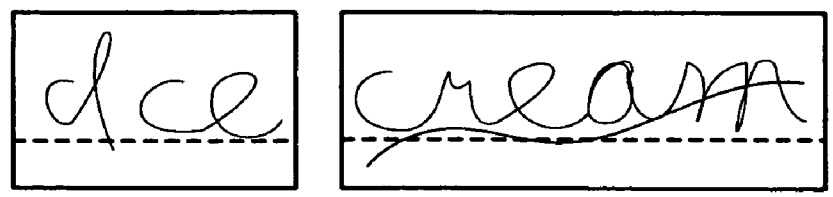
Figure 7B:
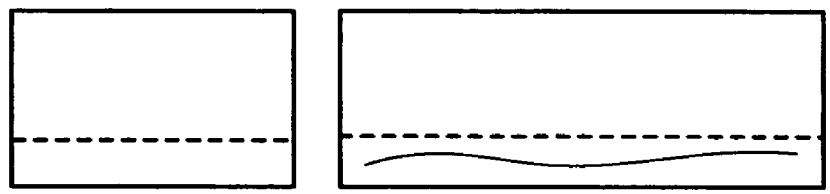

Further, in this implementation, the stroke needs to intersect with the word's bounding box by more than some amount (e.g., one-half) of the width of the word's bounding box, and a portion of the scratch-out stroke needs to be above the baseline for the line on which the word or words sit, e.g., so as to not confuse a scratch-out gesture with an underline and/or a character's descender. Thus, the gestures in FIGS. 6A and 7A are scratch-out gestures, while those in FIGS. 6B and 7B are not, wherein in FIGS. 6A and 6B the dashed lines indicate the centers width-wise, and in FIGS. 7A and 7B the dashed lines indicate the baselines.

Figure 8A:
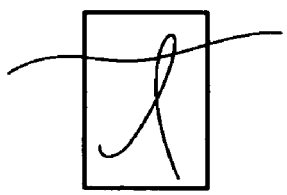
Figure 8B:
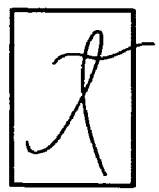

For words that are short in width as measured against some threshold distance unit such as inches or pixels, e.g., a one or two-character word such as "it" or the like, a stroke is required to have a bounding box width of a larger threshold percentage than previously described, typically greater than one-hundred percent of the word width. For example, an implementation may require that for any word that does not achieve some threshold length, such as a half-inch (on an appropriately-sized tablet), to qualify as a scratch-out gesture, the stroke width needs to be some other percentage value, e.g., at least 120 percent (as opposed to the 80 percent value in the example above) of the width of the box of the previously recognized word or words the stroke intersects. Thus, in the example of FIG. 8A, the stroke would meet this criteria, whereas in FIG. 8B, it would not. Note that in FIG. 8B, it appears to an extent that the short stroke may be an attempt to convert the lowercase "l" character to a "T" or "t" character, such as in a user "fix-up" operation following incorrect recognition. As can be readily appreciated, other size criteria may have other percentage values. For example, in order to scratch out a word that is greater than one-half inch in width and less than or equal to two-thirds of an inches in width, to qualify as a scratch-out gesture a stroke is required to have a bounding box width that is one-hundred percent or more of the width of the box of the previously recognized word that the stroke intersects, as opposed to an 80 percent threshold example of FIGS. 6A and 6B or the 120 percent threshold example of FIGS. 8A and 8B). Other criteria may be employed, such as for words less than a half-inch in width the scratch-out stroke may need to be generally centered on the word's center vertical access.

Figure 4:
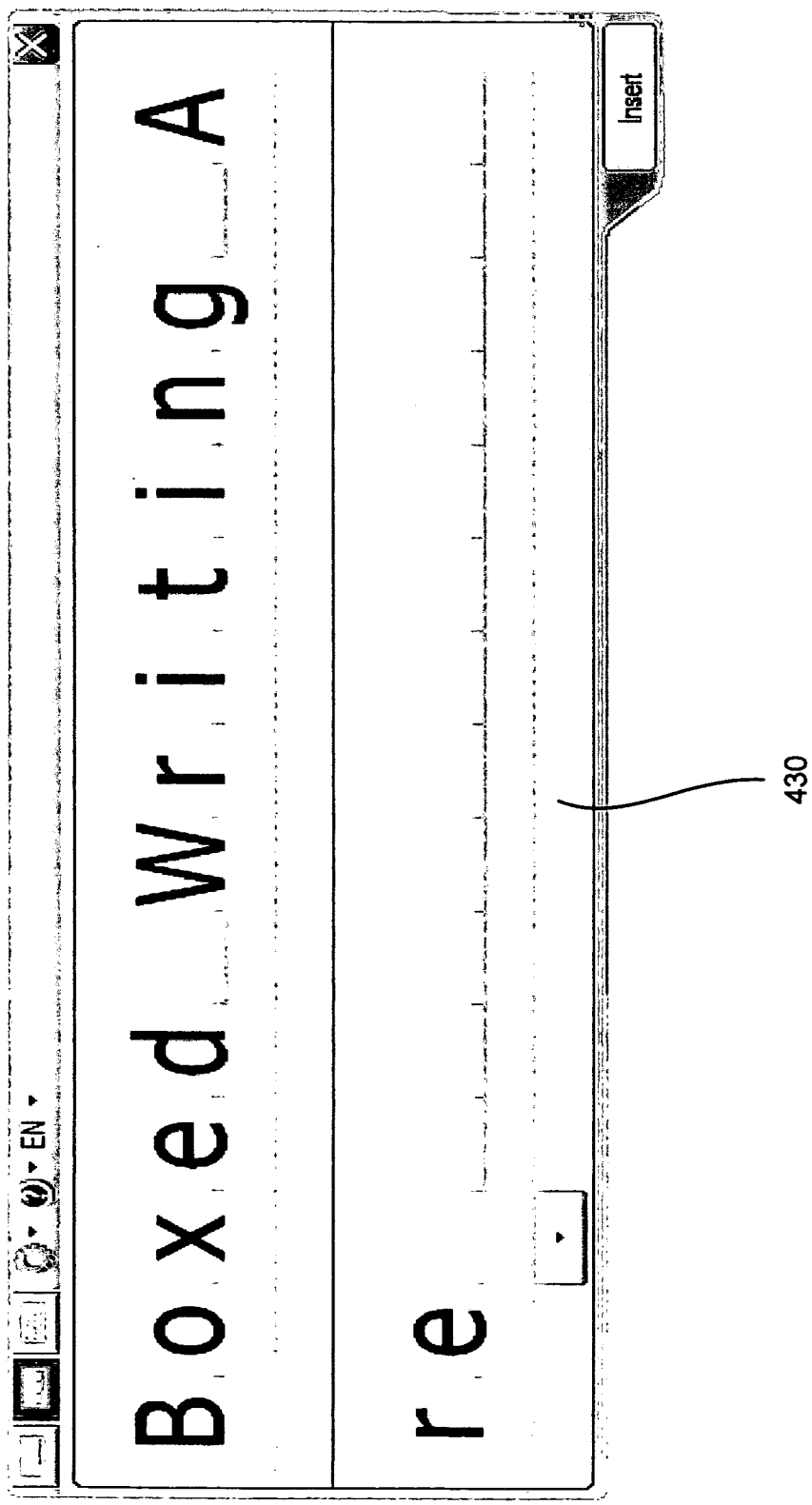
FIG. 4 is a representation of an example boxed writing area into which scratch-out gestures may be entered in accordance with various aspects of the present invention.

As described above, another type of writing entry surface comprises a boxed writing area, such as represented in FIG. 4. In a boxed writing area, a stroke is defined as a scratch-out gesture relative to a box or boxes if the stroke meets certain other criteria. In one implementation, such criteria includes that the stroke needs to intersect one or more previously recognized characters, and has a bounding box width that is at least some threshold percentage (e.g., 120 percent) of the width of the box of the previously recognized character or characters that the stroke intersects. Further, the stroke needs to cross the center vertical axis (half the width) of the box or boxes for the character or characters it intersects. A portion of the scratch-out stroke needs to be above the baseline for the line on which the character or characters sit.

Note that a scratch-out deletes the entire content of a box. Therefore, when a box in the boxed input area contains multiple characters, the scratch-out gesture deletes all characters in the box. It is possible for a single stroke to scratch-out multiple boxes, including boxes that are across multiple lines.

Certain rules may apply to a freeform lined area and a boxed writing area. For example, in order to allow for scratch-out styles such as crossing out a word (an X-out or a double-strikethrough approach), a stroke meeting certain criteria qualifies as a scratch-out gesture even if it does not intersect another ink stroke. Thus, if a stroke is added no more than a short amount of time (e.g., one second) after the pen up of the previous stroke when that previous stroke was a scratch-out gesture, the stroke may be considered part of the same scratch-out gesture. Other criteria that may be evaluated includes that the stroke intersects with the union of the bounding boxes previously scratched-out by more than some percentage (e.g., 80 percent) of the width of the unioned bounding boxes, and the stroke meets other criteria for being a scratch-out gesture, using the bounding box of the previously deleted ink in place of an intersected ink stroke.

When a word is scratched out and it is not the last word, the next word is deleted as well if there is no space between it and the previous word, and the word is one character long. Thus, a period is scratched out at the end of the sentence even though the scratch out gesture deletes the previous word but does not necessarily intersect with the period.

Figure 9:
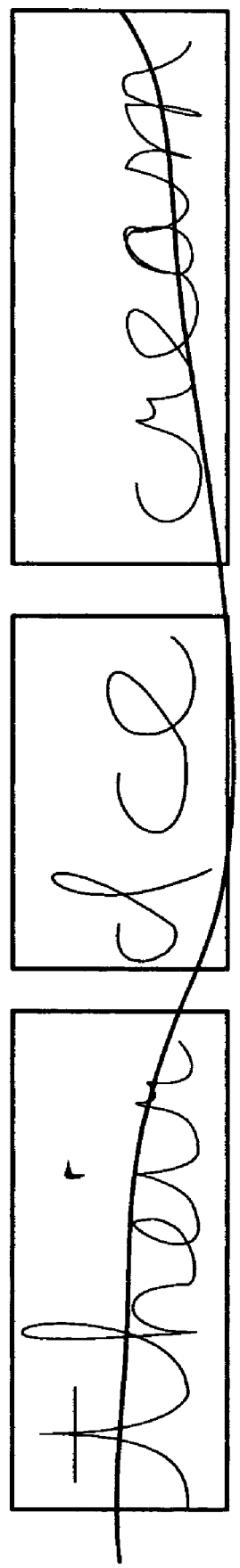

When a single stroke is used to scratch out multiple words or characters on a line, the words or characters between the first and last word or character scratched out are deleted, even if the stroke does not intersect one or more of their bounding boxes, or does not qualify as an scratch-out with respect to one or more of them. Thus, for example, in FIG. 9, the center word "Ice" would still be scratched out, even though the stroke is below the baseline of the word, and also even though the stroke does not intersect very much of the bounding box because the word is between two words scratched out with a single gestures. Similarly, when a single stroke is used to scratch out words or characters on multiple lines, the words or characters between the first and last word or character scratched out are deleted, even if the stroke does not intersect one or more of them or, if it does intersect, does not otherwise qualify as an scratch-out with respect to one or more of them.

Figure 10:
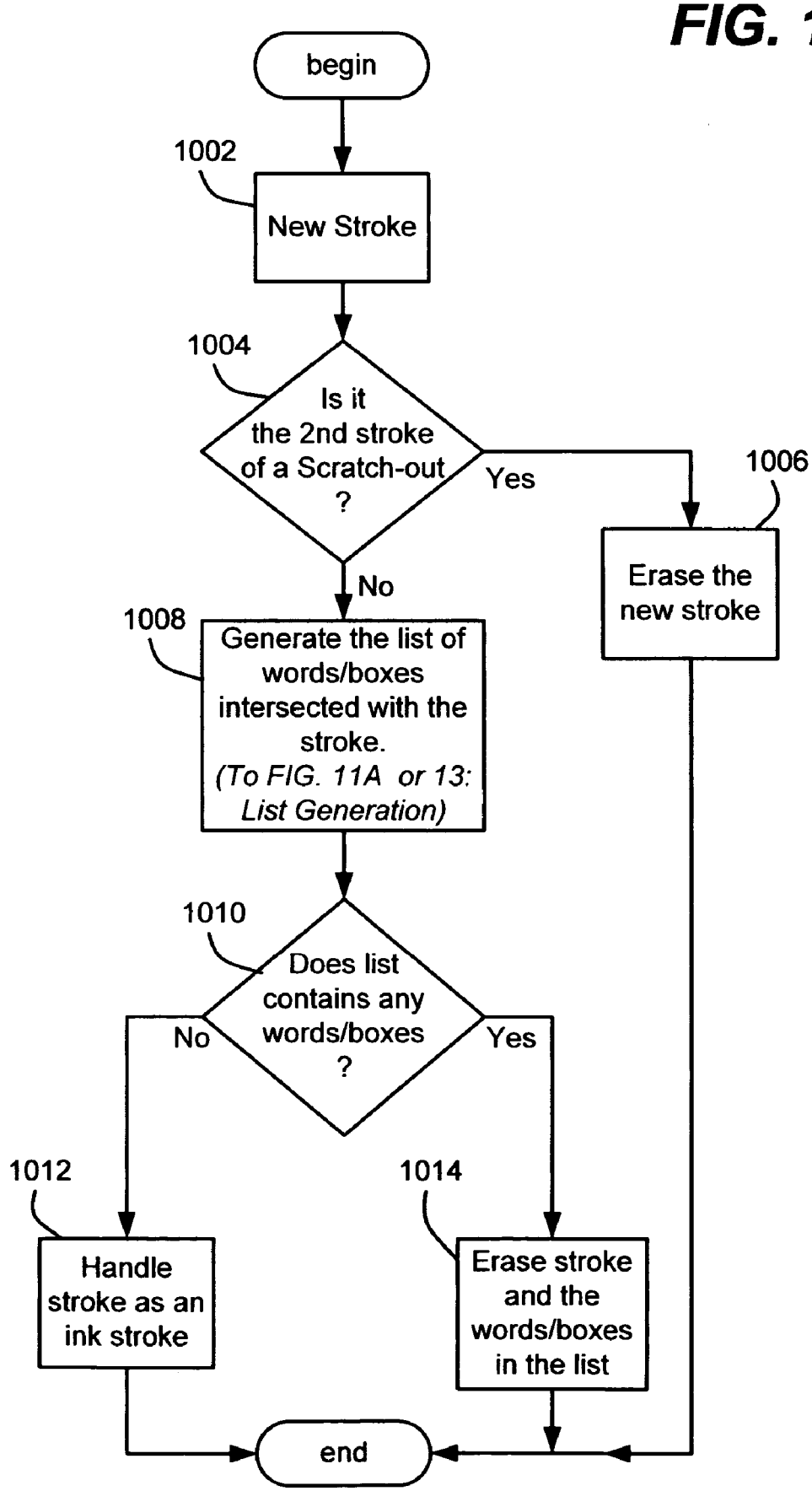
FIGS. 10-14 comprise flow diagrams generally representing example steps to differentiate scratch-out gestures from other ink and to construct a list of one or more words or boxes to delete when a scratch-out gesture is detected, in accordance to with various aspects of the present invention.

Turning to an explanation of the operation of the scratch out detection mechanism, FIG. 10 shows an example process when a new stroke is received, as represented by step 1002. Step 1004 tests whether the stroke is a second stroke of a previous scratch-out gesture, which as described above, occurs when a user makes a first scratch out gesture, lifts the pen, and makes a second gesture. As described above, considerations including are used at step 1004 to differentiate between whether the user intended a multi-stroke gesture or a new stroke following a scratch-out gesture. In the event that the stroke was a second stroke of a scratch-out gesture, the first stroke already has been determined to have been a scratch-out gesture, and the word or words (or box or boxes) to scratch out are known, whereby the new stroke may be automatically erased at step 1006. The process then ends until another new stroke is detected.

Returning to step 1004, if not the second stroke of a scratch-out, step 1008 is instead executed, essentially representing the generation of a list of words or boxes to which the possible scratch-out gesture applies, namely those that are intersected by the stroke. As described below with reference to FIGS. 11A and 11B for freeform (e.g., lined surface) input, and FIGS. 13 for boxed input, various evaluations are performed to determine whether the stroke is a scratch-out gesture, and if so, to what word(s) or box(es) the stroke applies. When invoked via step 1008, which inherently includes a determination of whether the user is writing on a freeform or boxed input surface, FIGS. 11A and 11B generate and return a list of zero or more words. When alternatively invoked via step 1008, FIG. 13 generates and return a list of zero or more boxes.

Figure 11A:
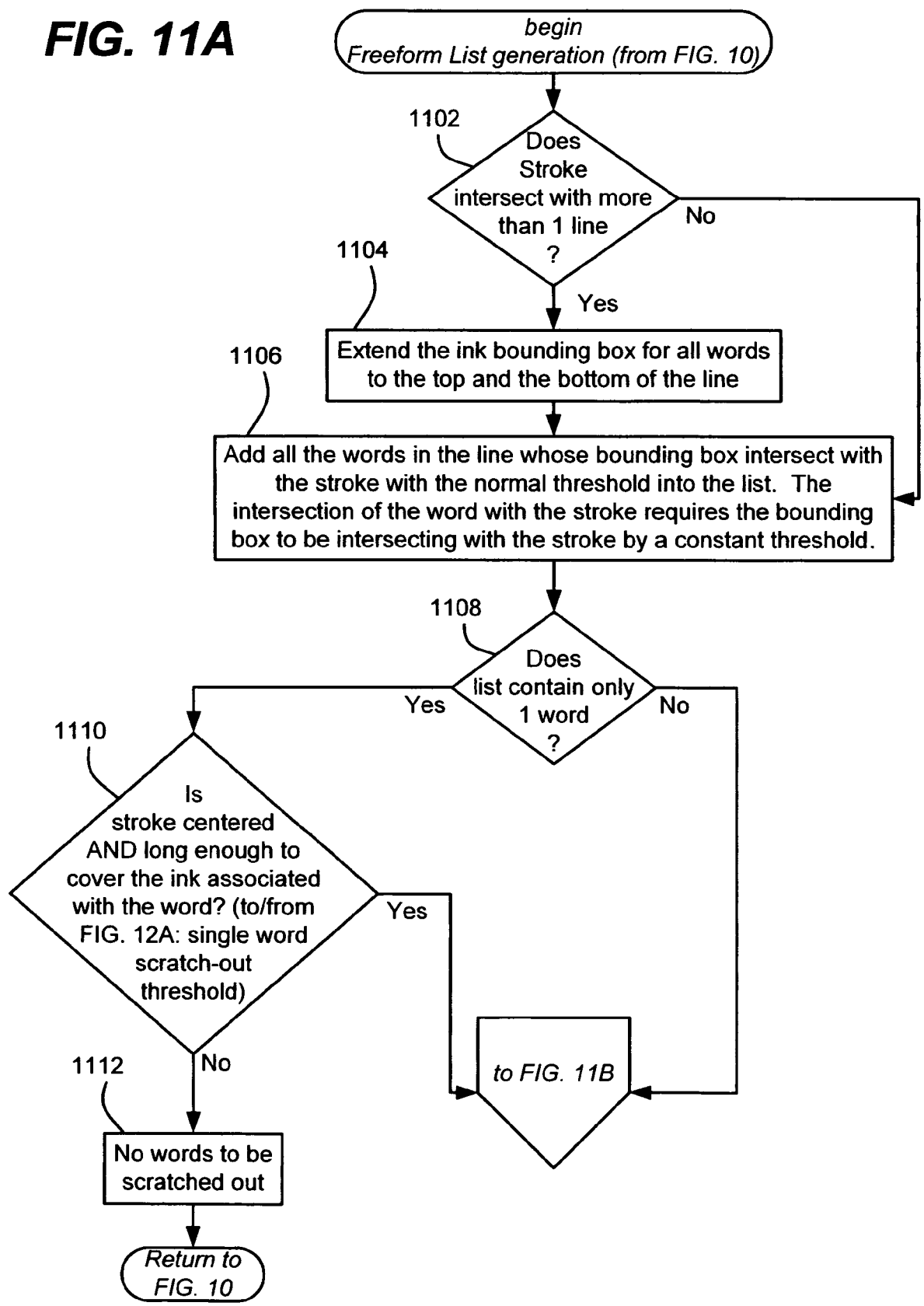
Figure 11B:
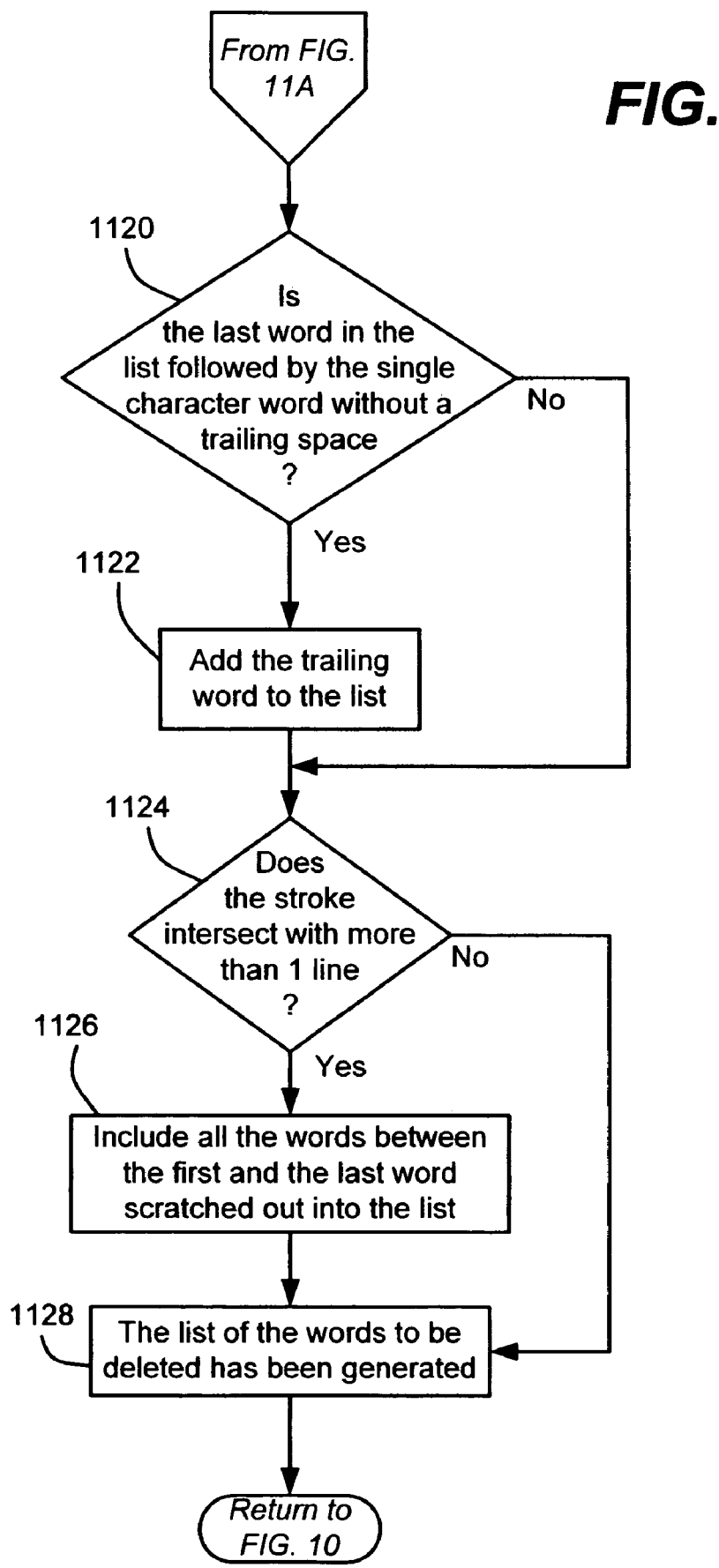
Figure 13:
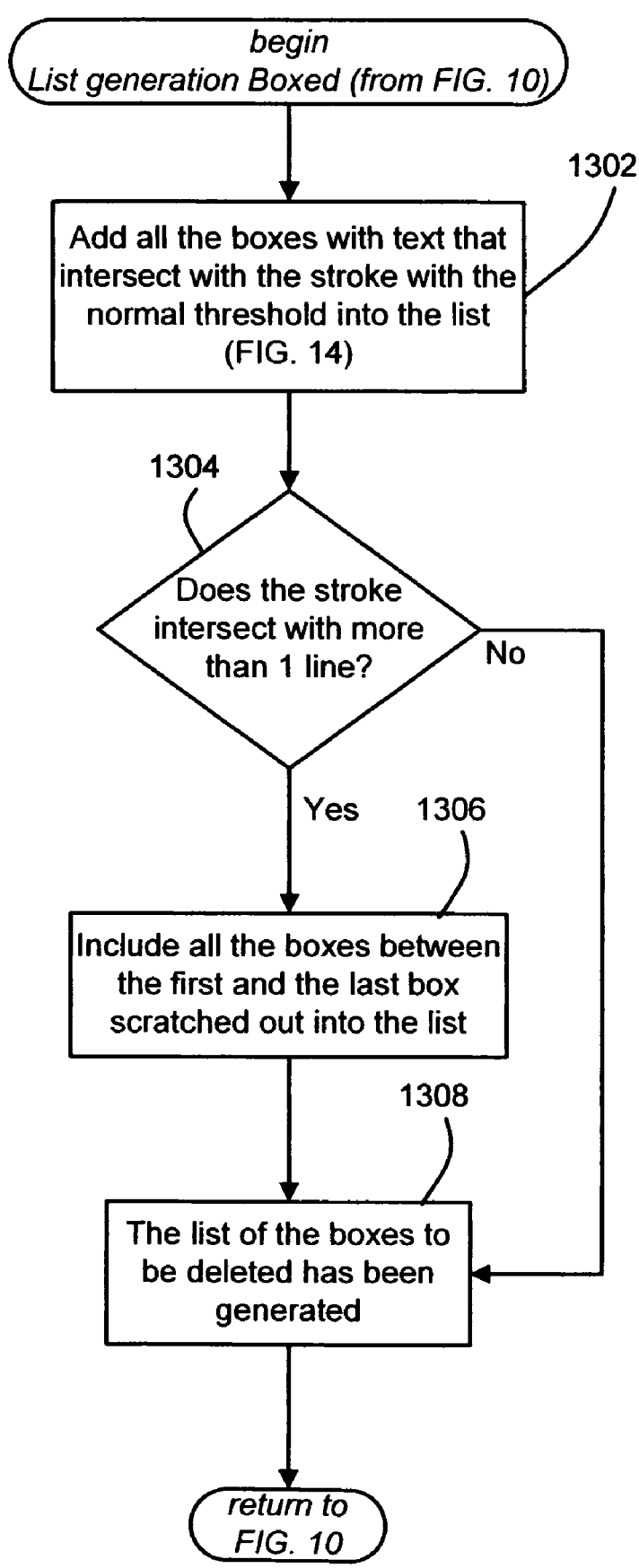

After invoking FIGS. 11A and 11B or FIG. 13, as appropriate, step 1010 evaluates whether the list of words or boxes is empty. If so, step 1010 branches to step 1012 to handle the stroke as an ink stroke, otherwise step 1014 is executed, which erases the stroke and the words or boxes in the list. The process then ends.

As mentioned above, FIGS. 11A and 11B represent the part of the process that is invoked when the user enters a new stroke on a freeform surface, to determine whether the stroke is a scratch-out gesture, and if so, to generate the list of words to delete. To this end, FIGS. 11A and 11B evaluate the stroke against various rules, including word rules based on threshold evaluations, as generally described below with reference to FIGS. 12A and 12B.

FIG. 11A begins its evaluation by determining at step 1102 whether the stroke intersects with more than one line. If so, the line boundary is changed from one line to multiple lines at step 1104, essentially by extending a virtual ink bounding box for all words to the top of the uppermost and the bottom of the lowermost line that is intersected by the stroke. In not intersecting more than one line, step 604 is bypassed.

Step 1106 then adds all the words in the line having a bounding box that intersects with the stroke with the normal threshold into the list, at least for now. The intersection of the word with the stroke requires the bounding box to be intersecting with the stroke by a constant threshold amount.

Step 1108 tests whether the list contains only one word. If not, the process continues to FIG. 11B, as described below. Otherwise, there is only one word in the list, and step 1110 is executed which tests the stroke length and whether it extends to at least the center of the bounding box, as described above and with reference to FIGS. 12A and 12B, below. If not, there are no words to scratch out, and the process returns to FIG. 10 where it ends. Otherwise, the process continues to FIG. 11B.

FIG. 11B tests for an exception, namely whether the last word in the list is followed by the single character word, without a trailing space. Similarly, the first word is evaluated for a preceding character. As described above, this handles punctuation (before and after words) such as a period, question mark, exclamation point, apostrophe, comma, quotation marks and so forth, as well as other characters. Note that handling preceding and trailing single character words also helps with language-independence, e.g., a Spanish-language question mark character appears upside-down preceding the sentence relative to how the question mark character ("?") appears ending the sentence. This also handles scratch-out operations in right-to-left (RTL) languages, such as Arabic-based languages or Hebrew. Since it is likely that the single character word is part of a word, step 1120 looks for this situation, and if found, adds the preceding and/or trailing single character word (or words) to the list at step 1122.

Step 1124 looks for a multi-line scratch-out, (but could also look for whether there are any intervening words between the first and last word on a single line), and if so, adds any intervening words between the first and the last word scratched out into the list. At this time, the list of words to delete is known, and the process returns to step 1010 of FIG. 10.

Figure 12A:
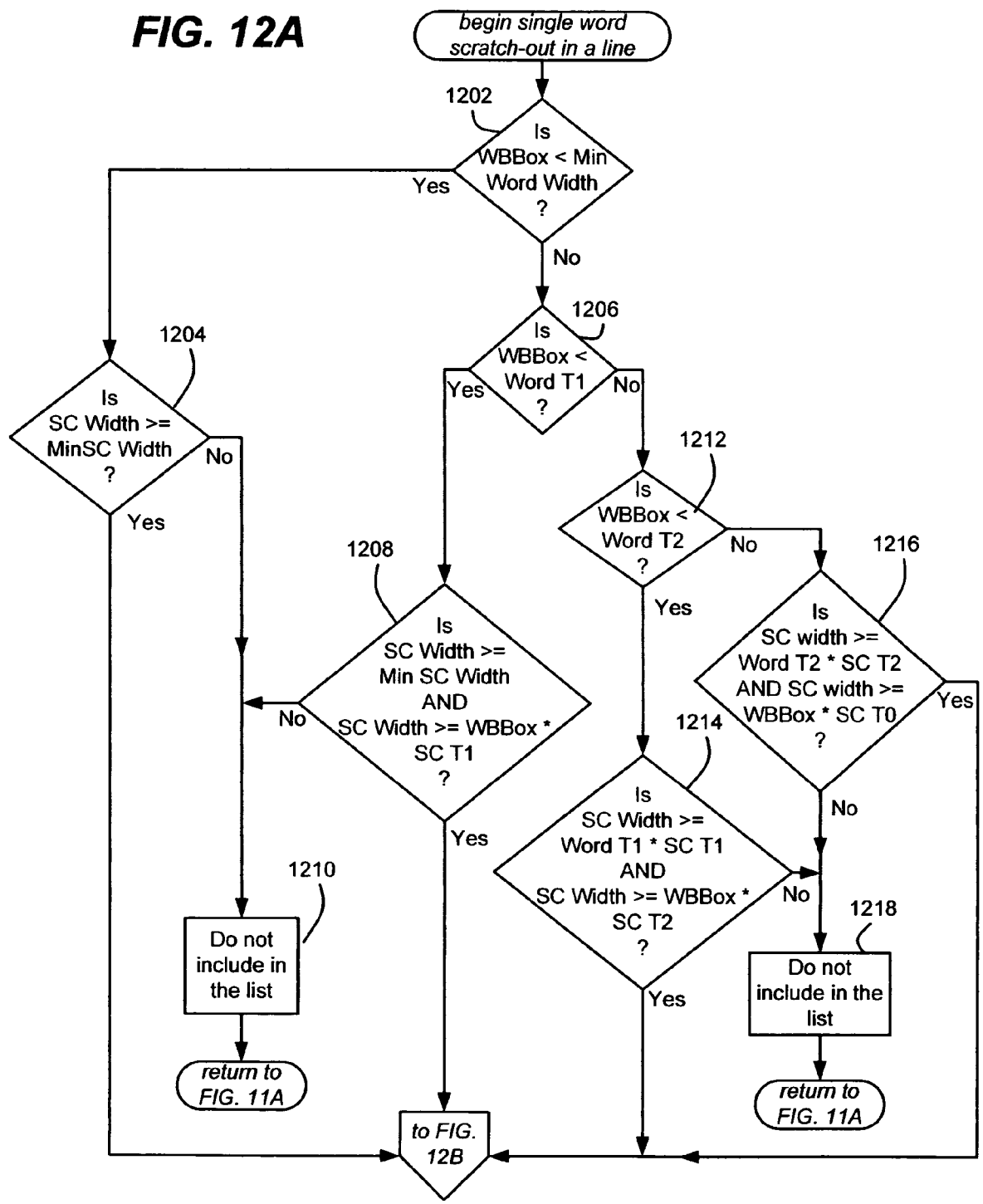
Figure 12B:
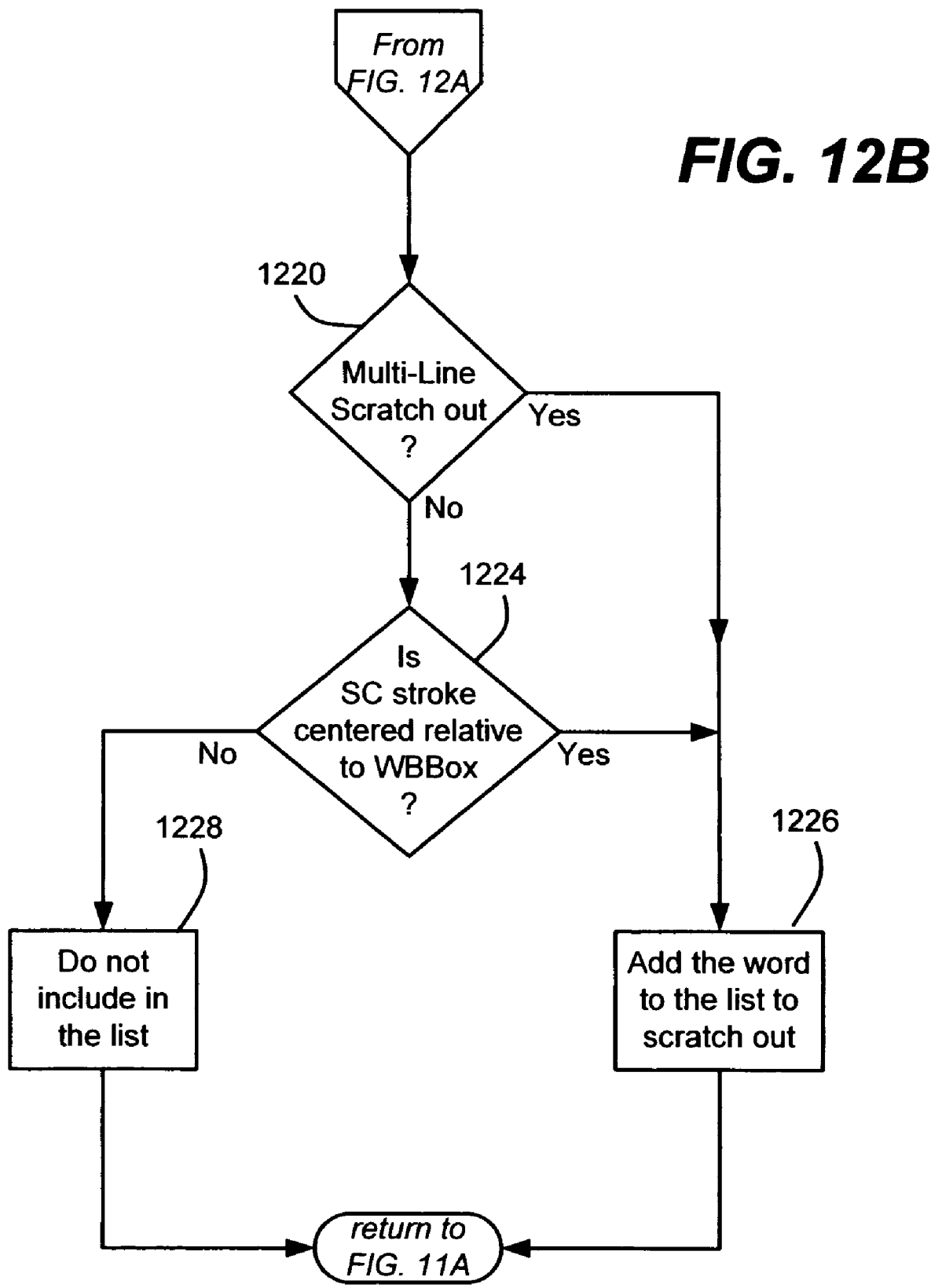

FIGS. 12A and 12B represent an example of the lined, single-word scratch-out evaluation in more detail. In FIG. 12, the following abbreviations are used:

---

Min Word Width = The minimum width of the word's ink bounding box.
Min SC Width = The minimum width of the scratch-out stroke.
Word T1 = The threshold value of the word's ink bounding box
SC T1 = The threshold value of the scratch out stroke width relative to Word Width T1 (in %).
Word T2 = The threshold value of the word's ink bounding box. (Word T1 < Word T2)
SC T2 = The threshold value of the scratch out stroke width relative to Word Width T2 (in %, SC T1 > SC T2).
WBBox = The ink bounding box of a word.
SC Width = The width of the scratch-out stroke
SC T0 = Threshold value of the scratch out stroke width relative to word width larger than T2 (in %, SC T2 > SC T0)

---

In FIG. 12A, step 1202 evaluates the ink bounding box of a word against a minimum, e.g., a half-inch as described above. If below the minimum, step 1202 branches to step 1204 where the scratch-out stroke width is compared to the threshold value of the scratch out stroke width, relative to word width, (e.g., in percent). If greater, the process continues to FIG. 12B, as described below. Otherwise step 1204 branches to step 1210, where the word is not included in the list.

Returning to step 1202, if the minimum is achieved, step 1206 is executed, which evaluates the ink bounding box of the word against a threshold value of the word's ink bounding box. If less than the threshold, step 1206 branches to step 1208 where the width of the scratch-out stroke is evaluated against further criteria. As represented at step 1208, the stroke width needs to be greater or equal to a minimum scratch-out stroke width, and also greater than the ink bounding box of a word times the percentage threshold value of the scratch out stroke width relative to the word width, otherwise the word is not included via step 1210. If both criteria are met at step 1208, the process continues evaluating via FIG. 12B, described below.

Returning to step 1206, when the ink bounding box exceeds the threshold value, step 1212 is executed, which compares the bounding box against a threshold value of the word's bounding box (Word T1<Word T2). If so the process continues to step 1214, otherwise the process continues to step 1216, which is the handler for the normal threshold. At step 1216, the width of the scratch-out stroke is evaluated against the threshold value of the word's ink bounding box times the threshold value of the scratch out stroke width relative to word width T2 (in percent), and also with the ink bounding box of a word and the threshold value of the scratch out stroke width relative to the word width larger than T2 (in percent). If the stroke width is not greater than or equal to both, the word is not included via step 1218, otherwise the process continues to FIG. 12B for further processing of the stroke data.

The "Yes" branch of step 1212 instead branches to step 1214, which analyzes the width of the scratch-out stroke. In particular, at step 1214 the scratch-out stroke needs to be at least as wide as the threshold value of the word's ink bounding box times the percentage threshold value of the scratch out stroke width relative to the word width, as well as at least as wide as the bounding box times the percentage threshold value of the scratch out stroke width relative to the word width. If not met, the word is not included via step 1218, otherwise the process continues to FIG. 12B.

At FIG. 12B, step 1220 evaluates the stroke for a multiple-line scratch out. If so, the word is added to the scratch out list via step 1226, and the process returns, essentially to FIG. 11A step 1110. If not, step 1224 determines whether the scratch-out stroke was centered (e.g., some part of it crossed the vertical axis) relative to the word's bounding box. If so, the word is added to the scratch out list via step 1226; if not, the word is not included via step 1228. As can be seen, free-form entered words are thus handled based on various threshold rules related to the bounding box and the possible scratch-out stroke or strokes; thus various styles of strokes are acceptable as scratch-out strokes.

Figure 14:
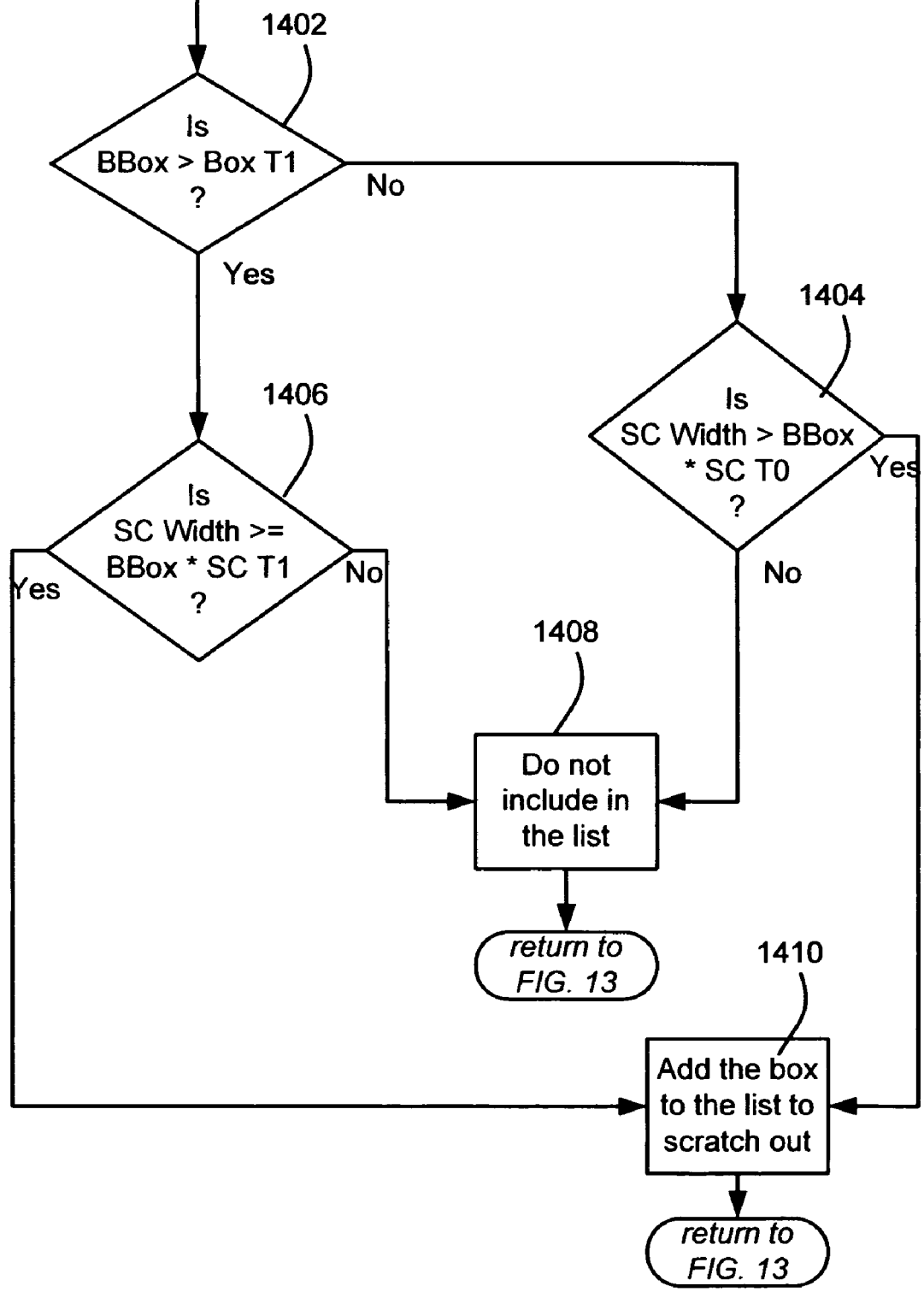

Returning to step 1008 of FIG. 10, instead of processing via steps 11A, for boxed input areas the list is generated via FIG. 13. Step 1302 represents adding the boxes with text that intersect with the stroke, with the normal threshold, into the list, as generally determined via FIG. 14. In FIG. 14, the following abbreviations are used:

---

Box T1 = The threshold value of the wide box
SC T0 = The threshold value of the scratch-out stroke width relative to normal box (in %).
SC T1 = The threshold value of the scratch-out stroke width relative to wide box (in %).
BBox = The width of the box.
SC Width = The width of the scratch-out stroke

---

Beginning at step 1402, the process evaluates whether the width of the box exceeds the threshold value of the wide box. If so, step 1404 compares the stroke width against the box width times the percentage threshold value of the scratch-out stroke width relative to normal box. If the stroke width is long enough at step 1404, step 1404 branches to step 1410 to add the box to the list. Otherwise, the box is not included in the list.

If instead at step 1402 the width of the box did not exceed the threshold value of the wide box, step 1402 branches to step 1406 where the stroke width is compared against the product of the width of the box times the percentage threshold value of the scratch-out stroke width relative to the wide box. If the stroke width achieves this threshold, the box is added to the list at step 1410, otherwise it is not included via step 1408.

Returning to FIG. 13, step 1304 determines whether the stroke intersects with more than one line. If so, step 1306 is executed to include the intervening boxes into the list. Otherwise, the step is bypassed. In any event, the list of (zero or more) boxes to delete is now complete, as represented at step 1308, and the process returns to FIG. 10, where the list is used as described above. In this manner, scratch-out gestures in boxed writing areas are likewise handled in a boundary/threshold-based way that allows various scratch-out gestures to be detected.

As can be seen from the foregoing detailed description, there is provided a method and system that uses bounding boxes and thresholds to evaluate a user's intent with respect to a scratch-out gesture. Styles of scratch-out gestures are mostly unconstrained, and users are better able to manipulate a pen when writing to differentiate a scratch-out gesture from other ink input.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method for intuitively applying scratch-out gestures in a computing device that comprises a handwriting surface component that receives electronic ink from a digitizer, as well as a component that provides boundary information corresponding to boundaries of words or characters and a scratch-out gesture detector coupled to the handwriting surface component and the component that provides the boundary information, wherein the scratch-out gesture detector also evaluates electronic ink received at the handwriting surface against criteria based on the boundary information to determine whether the electronic ink corresponds to any of a plurality of different acceptable scratch-out gesture types, the method comprising:
   the scratch-out gesture detector associating a plurality of different acceptable types of scratch-out gestures with a scratch-out gesture process that erases previously-entered ink;
   the computing device receiving user input corresponding to inking data entered via a digitizer at a handwriting surface component of the computing device;
   the scratch-out gesture detector evaluating the inking data based on boundary threshold data of at least one corresponding word or character displayed by the computing device to determine whether the user input is a scratch-out gesture corresponding to at least one of the plurality of different acceptable types of scratch-out gesture types and that would cause the scratch-out process to erase previously-entered ink; and wherein
   a) if the inking data is a scratch-out gesture, erasing previously-entered ink corresponding to the scratch-out gesture, as well as the inking data corresponding to the scratch-out gesture; and
   b) if the inking data is not a scratch-out gesture, processing the inking data as ink stroke data of at least part of a word or character.

2. The method of claim 1 wherein receiving user input corresponding to inking data entered via a digitizer corresponds to receiving computer pen-entered data.

3. The method of claim 1 wherein the inking data is received at a freeform writing area as a possible scratch-out gesture, wherein the boundary threshold data is based on a bounding box of a previously-entered word or character, and wherein evaluating the inking data comprises, comparing a width of the gesture relative to a width of the bounding box.

4. The method of claim 1 wherein evaluating the inking data based on boundary threshold data comprises determining whether the gesture extends into a bounding box of a previously-entered word or character beyond a certain point.

5. The method of claim 1 wherein the inking data is received at a freeform writing area as a possible scratch-out gesture, wherein the boundary threshold data is based on a bounding box of a previously-entered word or character, and wherein evaluating the inking data comprises, comparing a width of the bounding box to a minimum size, and if the width of the bounding box is below the minimum size, selecting a first threshold for a comparison with the width of the gesture, and if the width of the bounding box is above the minimum size, selecting a different threshold for a comparison with the width of the gesture.

6. The method of claim 1 wherein evaluating the inking data comprises, determining whether at least part of the gesture is above a baseline of a previously-entered word or character.

7. The method of claim 1 wherein the inking data is determined to be a scratch-out gesture that applies to at least two separated words or characters, and further comprising, erasing previously-entered ink corresponding to the separated words or characters, and erasing any intervening word or character between the separated words or characters.

8. The method of claim 1 wherein the gesture comprises at least one additional separate gesture stroke, and wherein evaluating the inking data comprises evaluating a first stroke of the gesture to determine whether the inking data is a scratch-out gesture, and if so, processing each additional stroke of the gesture as part of the first stroke of the gesture, including erasing each additional stroke.

9. The method of claim 1 wherein processing the inking data as ink stroke data comprises sending the inking data to a recognizer.

10. The method of claim 1 wherein the inking data is received at a boxed writing area as a possible scratch-out gesture, and wherein the boundary threshold data is based on a width of a box of a previously recognized character that the stroke intersects.

11. The method of claim 1 wherein evaluating the inking data based on boundary threshold data comprises determining whether the gesture extends a threshold distance into the box.

12. A computer-readable storage medium having computer-executable instructions, which when executed perform the method of claim 1.

13. The computer-readable medium of claim 12 wherein evaluating the inking data determines whether the criteria is met based on a ratio of a horizontal stroke width of the inking data to a horizontal width of the bounding container.

14. The computer-readable medium of claim 13 wherein the bounding container comprises a bounding box logically around a word entered via inking in a freeform writing area, and wherein evaluating the inking data comprises a selecting a threshold ratio based on the horizontal width of the bounding box versus a fixed value corresponding to a distance.

15. The computer-readable medium of claim 12 wherein evaluating the inking data determines whether the criteria is met based on whether a horizontal stroke of the inking data extends into the bounding container beyond a certain horizontal extent.

16. The computer-readable medium of claim 12, wherein evaluating the inking data determines that the criteria for a scratch-out gesture is met, and wherein erasing previously-entered ink comprises erasing at least one word or character between two other words or characters that are also erased, and/or erasing a single character word that directly precedes or trails a word that is also erased.

17. In a computing device, a system, comprising:
- a handwriting surface component that receives electronic ink from a digitizer;
- a component that provides boundary information corresponding to boundaries of words or characters; and
- a scratch-out gesture detector coupled to the handwriting surface component and the component that provides the boundary information, wherein the scratch-out gesture detector associates a plurality of different scratch-out types with a scratch-out process that erases previously entered ink that is identified by the scratch-out process and that also erases the electronic ink comprising the scratch-out gesture, wherein the scratch-out gesture detector also evaluates the electronic ink received at the handwriting surface against criteria based on the boundary information to determine whether the electronic ink corresponds to any one of the plurality of different acceptable scratch-out types associated with the scratch-out process.

18. The system of claim 17 wherein the component that provides boundary information comprises a handwriting recognizer.

19. The system of claim 17 wherein the criteria includes at least one criterion of a set, the set containing, whether the electronic ink intersects one or more previously recognized words or characters, whether the electronic ink has a bounding box width that is at least a threshold percentage of the width of a bounding box of at least one previously recognized word or character with which the electronic ink intersects, whether the electronic ink extends into a bounding box of at least one previously recognized word or character with which the electronic ink intersects beyond an threshold extent, and whether at least some portion of the electronic ink is above a baseline of at least one previously recognized word or character with which the electronic ink intersects.

20. The system of claim 17 wherein the handwriting surface component corresponds to a freeform writing area or to a boxed writing area.

\* \* \* \* \*